United States Patent [19]

Wilson et al.

[11] Patent Number: 5,190,641
[45] Date of Patent: Mar. 2, 1993

[54] HYDROCONVERSION CATALYST

[75] Inventors: Charles R. Wilson, San Francisco; Kirk R. Gibson, El Cerrito, both of Calif.

[73] Assignee: Chevron Research and Technology Company, San Francisco, Calif.

[21] Appl. No.: 791,217

[22] Filed: Nov. 13, 1991

Related U.S. Application Data

[62] Division of Ser. No. 543,257, Jun. 25, 1990, Pat. No. 5,089,462.

[51] Int. Cl.$^5$ .............. C10G 45/04; C10G 45/06; C10G 45/08
[52] U.S. Cl. .............. 208/254 R; 208/254 H
[58] Field of Search .............. 208/254 R, 254 H

[56] References Cited

U.S. PATENT DOCUMENTS

| | | | |
|---|---|---|---|
| 3,205,165 | 9/1965 | Hilfman | 208/254 |
| 3,401,125 | 9/1968 | Jaffe | 208/111 |
| 3,840,473 | 10/1974 | Beuther | 208/216 R |
| 3,897,365 | 7/1975 | Feins et al. | 208/216 R |
| 4,444,655 | 4/1984 | Shiroto et al. | 208/210 |
| 4,465,790 | 8/1984 | Quayle | 208/254 H |
| 4,490,483 | 12/1984 | Vogel et al. | 502/309 |

*Primary Examiner*—Theodore Morris
*Assistant Examiner*—Zeinab El-Arini
*Attorney, Agent, or Firm*—Burns, Doane, Swecker & Mathis

[57] ABSTRACT

A method for making a hydrotreating catalyst wherein the catalyst is prepared by mixing a peptized hydrated supporting oxide with a hydrated Group IVB metal oxide gel promoter. The Group VIII metals are mixed in with the Group IVB metal oxide gel promoter. A solution containing a soluble Group VIB metal and a basic compound is added. The catalyst is used for hydrodenitrogenation and Ramsbottom Carbon Residue reduction of a hydrocarbon feedstock.

13 Claims, No Drawings

HYDROCONVERSION CATALYST

This application is a divisional of application Ser. No. 07/543,257, filed Jun. 25, 1990, now U.S. Pat. No. 5,089,462.

BACKGROUND OF THE INVENTION

This invention relates to hydrotreating of hydrocarbon feedstocks and more particularly to catalytic treatment of hydrocarbon feedstocks to effect removal of nitrogen and sulfur, and to reduce Ramsbottom Carbon Residue (RCR). This invention is especially directed toward the preparation of a catalytic composition having excellent hydrotreating activity for the removal of nitrogen and reduction of Ramsbottom Carbon Residue in heavy hydrocarbon stocks. Examples of such heavy stocks are total crude oil, crude residue, atmospheric and vacuum gas oils, cycle oils and lube oils.

Crude petroleum oil, and heavy hydrocarbon fractions and/or distillates derived from crudes, contain components such as nitrogen, sulfur and metals. These impurities may exist in heteratomic compounds and are often present in relatively large quantities. Such impurities may poison or modify catalysts used in the upgrading of petroleum fractions in reforming or cracking steps. Nitrogen and sulfur are also objectionable because combustion of hydrocarbon fuels containing these impurities releases nitrogen and sulfur oxides. Such byproduct gases are noxious, corrosive and present a serious problem in the field of air pollution.

The removal and/or conversion of these impurities is effectively carried out by catalytic hydrotreating, where a feedstock containing sulfur and nitrogen is contacted with a supported catalyst in the presence of hydrogen. Hydrotreating conditions may include a wide range of temperatures, pressures and space velocities as determined by the design of commercial refineries.

Supported catalysts can be generally characterized as comprising metallic components, supported on a refractory inorganic oxide carrier of synthetic or natural origin and having a medium to high surface area (typically greater than 50 m$^2$/g) and a well-developed pore structure. Metallic components having hydrotreating activity may include the metals of Groups VIB and VIII of the Periodic Table. The "Periodic Table" as herein referred to appears in the 62nd Edition of the Handbook of Chemistry and Physics, CRC Press Inc., Boca Raton, Fla. (1981).

Group IVB metal components (for example, titanium) can be incorporated into the catalyst as a promoter to increase the activity of the catalyst. Phosphorous components are commonly incorporated into the catalyst to improve its activity by increasing its acidity; however, the prior art (U.S. Pat. No. 3,840,473) has taught that when the presence of phosphorous is greater than about 0.5% by weight in a titanium-containing catalyst, phosphorous is detrimental to the activity of the catalyst.

Numerous disclosures have been made directed to methods for preparing supported catalyst for hydrotreating. Catalytic metals may be applied to a formed or unformed carrier by several methods known in the art which include co-precipitation of the support with active metals and promoter (also known as the cogel method), mixing the active metals and promoter into a peptized substrate, and by various impregnation procedures on preformed substrates.

U.S. Pat. No. 3,401,125 discloses co-precipitation of the support with active metals including Group IVB to give an active hydrodenitrogenation catalyst. This method requires washing steps which are expensive, and metals, particularly the molybdenum, may be partially washed off the catalyst.

U.S. Pat. No. 3,897,365 discloses a process for preparing a hydrotreating catalyst comprising mixing molybdenum with an inorganic oxide gel consisting of at least 50 weight percent alumina, up to 50 weight percent silica, and up to a total 10 weight percent titania. The molybdenum oxide is from 5 to 15 weight percent. The catalyst is further impregnated with phosphorous, nickel and molybdenum.

The process for preparing a hydrotreating catalyst described in U.S. Pat. No. 3,897,365 differs from the method of our invention in that our invention involves mixing the Group VIII and Group VIB metals rather than impregnating these metals into the organic support.

U.S. Pat. No. 4,196,101 discloses a process for preparing a hydrodesulfurization catalyst comprising mixing alumina with water and a hydrolyzeable titanium compound under non-acidic conditions. Group VIII and Group.VIB metals are subsequently impregnated into the inorganic support.

The method described in U.S. Pat. No. 4,196,101 differs from the method of our invention in that our invention involves mixing the Group VIII and Group VIB metals rather than impregnating these metals into the organic support.

U.S. Pat. No. 4,465,790 discloses a hydrodenitrogenation catalyst comprising molybdenum and nickel on a catalyst support consisting of co-precipitated alumina and titania.

The method described in U.S. Pat. No. 4,465,790 differs from the method of our invention in that alumina and titania are not co-precipitated. Instead, the gelled Group IVB metal compound is mixed with a supporting oxide, the Group VIB and Group VIII metal components.

U.S. Pat. No. 4,444,655 discloses the use of a hydrotreating catalyst in a process for hydrotrealing a heavy hydrocarbon oil containing asphaltenes. The hydrotreating catalyst utilizes inorganic oxides selected from Groups II, III and IV of the Periodic Table. The catalytic metal components are selected from metals belonging to Groups VB, VIB, VIII and IB of the Periodic Table.

The catalyst of the '655 patent has an average diameter of about 180 angstroms to about 500 angstroms, with total volume of such pores being larger than about 0.2 cc/g.

SUMMARY OF THE INVENTION

In accordance with the present invention there is provided a mixed composition comprising: (a) a supporting oxide; (b) a gelled Group IVB promoter; (c) hydrogenation components including at least one component from a Group VIII metal and at least one component from a Group VIB metal.

There is also provided a method for making a hydrotreating catalyst which comprises: (a) precipitating a hydrolyzeable Group IVB compound to form a hydrated Group IVB oxide gel; (b) washing the hydrated Group IVB oxide gel with water to substantially remove non-Group IVB components; (c) adding aqueous acidic compounds and a soluble Group VIII metal compound to the hydrated Group IVB oxide gel, forming a slurry; (d) mixing and peptizing a hydrated supporting oxide with the slurry; (e) adding a partially or totally soluble Group VIB metal compound; (f) shaping, drying and calcining catalyst particles, and the use of a catalyst so prepared in a process for removing nitrogen from a nitrogen-containing hydrocarbon feed. The denitrogenation process comprises contacting the hydrocarbon stream under hydrodenitrogenation conditions and in the presence of hydrogen with the aforesaid catalyst.

Hydrodenitrogenating in accordance with the present invention results not only in substantial nitrogen removal, but also results in substantial RCR reduction of the feedstock, and sulfur removal.

Thus, among other factors, the present invention is based on our discovery that the use of a gelled Group IVB metal compound, preferably a titanium compound when mixed with a supporting oxide, the Group VIB and Group VIII metal components, acts as a promoter for increasing hydrodenitrogenation activity of the catalytic metal, i.e., the Group VIB and Group VIII metal components, present in the catalyst.

DETAILED DESCRIPTION OF THE INVENTION

As indicated previously, the composition of the present invention comprises: (a) a supporting oxide; (b) a gelled Group IVB promoter; (c) hydrogenation components including at least one component from a Group VIII metal and at least one component from a Group VIB metal.

The Group IVB metals which can be used as promoters include titanium, zirconium and hafnium.

The supporting oxide used is alumina.

The hydrogenation components may be selected from among the metals belonging to Groups VIB and VIII of the Periodic Table, preferably nickel, cobalt, molybdenum and tungsten. Table I summarizes the range of metals which can be used in making the catalyst.

Most preferably, the catalyst comprises an aluminum oxide support, a titanium promoter, and nickel and molybdenum hydrogenation components.

TABLE I

| Metal Component | Broad, wt. % | Preferred, wt. % |
|---|---|---|
| Ti | 0.5–10.0 | 2.5–6.5 |
| Zr | 1.0–20.0 | 4.5–12.5 |
| Hf | 2.0–40.0 | 9.0–24.0 |
| Ni | 1.0–15.0 | 5.0–10.0 |
| Co | 1.0–15.0 | 5.0–10.0 |
| Mo | 5.0–25.0 | 10.0–20.0 |
| W | 10.0–50.0 | 20.0–40.0 |

The catalyst may be further impregnated using standard impregnating procedures and compounds such as phosphoric acids, ammonium phosphate salts, and heteropolyphosphomolybdic acid.

The catalyst of this invention has a pore volume falling within a range of 0.30–0.60 cc/g and pore size distribution peaks falling within a range of 50–100 angstroms. The pore size distributions are relatively narrow with at least 50% of the total pore volume contained in pores with diameters falling within 20 angstroms of the peak.

Preferably, the catalyst of this invention has a pore volume falling within a range of 0.37–0.52 cc/g and pore size distribution peaks falling within a range of 60–90 angstroms. The pore size distributions are relatively narrow with at least 60% of the total pore volume contained in pores with diameters falling within 20 angstroms of the peak.

A method is also presented as part of the invention for making the composition wherein a hydrolyzeable Group IVB compound is precipitated to form a Group IVB oxide gel. The hydrated Group IVB oxide gel is subsequently washed. The preferred Group IVB compounds used to make the catalyst are titanium compounds. These include the hydrolyzeable titanium compounds. There are many sources of hydrolyzeable titanium compounds. Alkyl titanates such as tetrabutyl titanate or chelated titanium species such as the acetyl acetonate complexes or lactic acid salts may be used. Most preferably, inorganic titanium compounds such as titanium sulfate or various titanium halides may be used.

When aqueous acidic compounds and a soluble Group VIII metal compound is added to the hydrated Group IVB oxide gel, a slurry is formed. The hydrated supporting oxide is mixed and peptized with the slurry. Aqueous acid compounds which can be used in our method include acetic acid, nitric acid, sulfuric acid, oxalic acid, hydrochloric acid and formic acid. However, other acid compounds can be used in our method. The preferred Group VIII metal compounds which may be used to make the catalyst are nickel compounds. These include nickel acetate, nickel nitrate, nickel sulfate, nickel oxide, nickel chloride, nickel carbonate and nickel hydroxide and mixtures thereof.

A soluble Group VIB metal compound is added to the peptized mixture. The preferred Group VIB metal compounds used in making our catalyst is molybdenum. These include ammonium molybdate, ammonium compounds of molybdenum oxides, molybdenum oxides and their hydrogen peroxide solutions.

It is preferable to use metal compounds which are readily soluble in appropriate solutions. Readily soluble metal compounds are not necessarily totally dissolved in the appropriate solution.

The composition is then extruded, dried to remove volatiles, and then calcined in air at a temperature of from about 750° F. to about 1250° F. for about ½ to 4 hours.

The catalyst of the present invention can be used for hydroprocessing, e.g., hydrotreating, hydrocracking or the like. According to one preferred embodiment of the present invention, the present catalyst is used in a hydrotreating process to reduce the nitrogen and sulfur content and RCR. Suitable hydrotreating feedstocks include any hydrocarbon feedstock containing nitrogen with a boiling point greater than 500° F. This includes unprocessed and partially hydrodemetallized vacuum and atmospheric residua and crude deasphalted oil, vacuum gas oil, heavy crude oils and lube oil.

These feedstocks can be passed over the catalyst of the present invention at a liquid hourly space velocity in a reactor of about 0.05 to about 5.0, preferably from about 0.1 to about 3.0, while maintaining the reaction zone at a temperature of from 500° F. to about 850° F., preferably from about 550° F. to about 800° F., while under a total pressure of about 450 to about 3500 pounds per square inch gauge, preferably from about 600 to about 2800 pounds per square inch gauge, and a hydrogen partial pressure of from about 350 to about 3200 pounds per square inch gauge, preferably from about 500 to about 2500 pounds per square inch gauge.

EXAMPLE 1

TiCl$_4$ was titrated with ammonium hydroxide to a pH of 7 to form a hydrated titania gel. The excess chloride ions were washed out with ammonium acetate solution.

EXAMPLE 2

A catalyst is prepared using ammonium heptamolybdate (AHM).

685 gms of a TiO$_2$ gel, as prepared in Example 1, were well mixed with 191 gms deionized water. While mixing, 193 gms glacial acetic acid were added to the slurry. Then 214 gms basic nickel carbonate were added. The slurry was mixed until CO$_2$ evolution essentially ceased. Then, 108.6 gms nitric acid (70% HNO$_3$) were slowly added to the slurry. This slurry was labeled "2A".

30 gms hydrogen peroxide solution (30% H$_2$O$_2$) were mixed with 151 cc deionized water. 347 gms AHM were slowly added and stirred until dissolved. This solution was labeled Solution "2B".

1023 gms of pseudo boehmite alumina powder (760 gms dry-basis Al$_2$O$_3$) were charged to a sigma-blade mixer. Slurry 2A was added while mixing. After 20 minutes, Solution 2B was added while mixing. After 20 minutes mixing, the wet mix was extruded.

The extrudates were dried and calcined at 950° F. for 1 hour with flowing dry air to give the final calcined catalyst.

EXAMPLE 3

Another catalyst of this invention was prepared using MoO$_3$. 108.6 gms nitric acid (70% HNO$_3$) were added to 200 gms of deionized water. This solution was labeled "3A".

287 gms of a TiO$_2$ gel, as prepared in Example 1, were well mixed with 300 gms deionized water. While mixing, 400 gms of nickel acetate tetrahydrate [Ni(C$_2$H$_3$O$_2$)$_2$·4H$_2$O] were added to the slurry. This slurry was labeled "3B".

A molybdenum solution was prepared by stirring and filtering a mixture composed of 26.5 wt. % concentrated aqueous NH$_4$OH, 28.9 wt. % MoO$_3$, balance deionized water. 100 cc concentrated aqueous NH$_4$OH were mixed with 753 cc of the molybdenum solution. The resultant solution was labeled "3C".

1000 gms of pseudo boehmite alumina powder (760 gms dry-basis Al$_2$O$_3$) were charged to a sigma-blade mixer. Solution 3A was added while mixing. Then Slurry 3B was added while mixing. Finally, Solution 3C was added. After another 20 minutes mixing, the wet mix was extruded.

The extrudates were dried and calcined at 1000° F. for 1 hour with flowing dry air to give the final calcined catalyst.

Examples 4 through 6 illustrate different methods which can be used to prepare various hydrotreating catalysts. These catalysts contain a titania-alumina inorganic oxide support and nickel and molybdenum hydrogenation components.

EXAMPLE 4

A comparative catalyst was prepared using Ti(OH)$_4$.

286.5 gms Ti(OH)$_4$, an aqueous commercially available titanium source [titanium hydrolysate], were mixed with stirring in 300 gms of deionized water. 400 gms Ni(C$_2$H$_3$O$_2$)$_2$·4H$_2$O [nickel acetate tetrahydrate] were then slowly added with continued stirring. This mixture was labeled "4A".

108.6 gms nitric acid (70% HNO$_3$) were added to 200 gms of deionized water. This solution was labeled "4B".

A molybdenum solution was prepared by stirring and filtering a mixture composed of 26.5 wt. % concentrated aqueous NH$_4$OH, 28.9 wt. % MoO$_3$, balance deionized water. 100 cc concentrated aqueous NH$_4$OH were mixed with 753 cc of the molybdenum solution. The resultant solution was labeled "4C".

1000 gms of pseudo boehmite alumina powder (760 gms dry-basis Al$_2$O$_3$) was charged to a sigma-blade mixer. Solution 4B was added and mixing continued for 10 minutes. Solution 4A was added and mixing continued for 10 minutes.

Solution 4C was then added and the mixing was continued for an additional 20 minutes. The wet mix was extruded.

The extrudates were dried and calcined at 1150° F. for 2 hours with flowing dry air to give the final catalyst.

EXAMPLE 5

A comparative catalyst was prepared using finely divided TiO$_2$.

108.6 gms of nitric acid (70% HNO$_3$) were diluted with 200 gms of deionized water. 400 gms of Ni(C$_2$H$_3$O$_2$)$_2$·4H$_2$O [nickel acetate tetrahydrate] were then dissolved. This solution was labeled "5A".

85.2 gms of (TiO$_2$) [anatase titania] were stirred in 199 gms of deionized water. This slurry was labeled "5B".

A molybdenum solution was prepared by stirring and filtering a mixture composed of 26.5 wt. % concentrated aqueous NH$_4$OH, 28.9 wt. % MoO$_3$, balance deionized water. 100 cc concentrated aqueous NH$_4$OH were mixed with 753 cc of the molybdenum solution. The resultant solution was labeled "5C".

1000 gms of pseudo boehmite alumina powder (760 gms dry-basis Al$_2$O$_3$) was charged to a sigma-blade mixer. Solution 5A was added while mixing. Then Slurry 5B was added while mixing. After an additional 10 minutes of mixing, Solution 5C was added and the mixing was continued for an additional 20 minutes. The wet mix was extruded.

The extrudates were dried and calcined at 950° F. for 1 hour using flowing dry air.

EXAMPLE 6

A comparative catalyst was prepared from co-precipitated titania-alumina powder.

35 gms of nitric acid (70% HNO$_3$) were diluted with 35 cc of deionized water. The solution was labeled "6A".

304 gms of nickel nitrate [Ni(NO$_3$)$_2$·6H$_2$O] were dissolved in 375 cc deionized water. Then Solution 6A was added. This solution was labeled "6B".

A molybdenum solution was prepared by stirring and filtering a mixture composed of 26.5 wt. % concentrated aqueous NH$_4$OH, 28.9 wt. % MoO$_3$, balance deionized water. 16.8 cc concentrated aqueous NH$_4$OH was mixed with 515 cc of the molybdenum solution. 35 cc deionized water were added. This solution was labeled "6C".

700 gms of a commercially available 10%/90% TiO$_2$/Al$_2$O$_3$ powder were charged to a sigma-blade mixer. Solution 6B was added with mixing. Mixing was continued for an additional 20 minutes.

Solution 6C was then added and mixing was continued for an additional 20 minutes. The wet mix was extruded.

The extrudates were dried and calcined at 950° F. for 1 hour with flowing dry air to give the final calcined catalyst.

EXAMPLE 7

In this example, the catalyst of Example 3 is contrasted with the comparative catalysts of Examples 4–6 and commercial residuum catalysts. The feed used in this comparison was an Alaska North Slope straight run vacuum residuum having the properties shown in Table II.

TABLE II

| | |
|---|---|
| Gravity, °API | 7.0 |
| Sulfur, wt. % | 2.29 |
| Nitrogen, wt. % | 0.78 |
| Oxygen, wt. % | 0.51 |
| Ramsbottom Carbon, wt. % | 17.9 |
| Micro-carbon Residue | 17.9 |
| Asphaltenes, wt. % | 3.21 |
| Ni/V/Fe, ppm | .36/76/3 |
| Distillation, vol. % | |
| St/5 | 922/1012° F. |
| 10/20 | 1017/1047° F. |

An alternative way of measuring Ramsbottom Carbon is using ASTM D4530-85. The number obtained is referred to as Micro-carbon Residue.

The hydrotreating conditions used for this example are listed in Table III:

TABLE III

| | |
|---|---|
| Total pressure, psig | 2000 |
| Feed rate (LHSV), hr.$^{-1}$ | 0.5 |
| Hydrogen/hydrocarbon feed rate, scf/bbl | 5000 |

The catalysts were activated by a pre-sulfiding step before contact with the hydrocarbon feed.

The catalysts of Examples 3–6 were compared for residuum conversion by running to constant sulfur removal (HDS), while monitoring nitrogen removal (HDN) and micro-carbon residue (MCR) removal. The measure of catalyst performance was the normalized catalyst temperature required to meet target product properties. Table IV compares the performance of the catalyst of this invention (Example 3) with the comparative catalysts of Examples 4–6, and with comparative commercial nickel, molybdenum, phosphorous, alumina residuum processing catalysts (catalysts A, B).

In this test, a good catalyst deactivates rapidly for 300–400 hours before lining out at a lower deactivation rate. To compare these catalysts, we compared normalized activities at 600 hours. However, if a catalyst is fouling very rapidly with obviously poor activity, we sometimes stop the test before 600 hours. Table IV contains data at 600 hours for those tests which ran that long and for shorter periods for tests which were stopped early.

TABLE IV

| | Ex 3 | Ex 4 | Ex 5 | Ex 6 | Catalyst A | Catalyst B |
|---|---|---|---|---|---|---|
| Run Hrs. | 300 | 600 | 600 | 300 | 400 | 250 |
| Normalized Catalyst Temp. °F. | | | | | | |
| HDS | 732 | 743 | 766 | 749 | 770 | 755 | 768 |
| MCR | 732 | 740 | 751 | 736 | 776 | 768 | 765 |

TABLE IV-continued

| | Ex 3 | Ex 4 | Ex 5 | Ex 6 | Catalyst A | Catalyst B |
|---|---|---|---|---|---|---|
| HDN | 731 | 741 | 756 | 749 | 779 | 765 | — |

What is claimed is:

1. A method of hydrodenitrogenation of a hydrocarbon feed containing nitrogen compounds, which method comprises contacting said feed in a reaction zone under hydrodenitrogenation conditions comprising a temperature within the range of about 500° F. to about 850° F., a total pressure within the range of about 450 to about 3500 pounds per square inch gauge, its space velocity ranging from 0.05 to about 5.0 (hr.$^{-1}$), and a hydrogen partial pressure ranging from about 350 to about 3200 pounds per square inch gauge in the presence of hydrogen and with a catalyst prepared by the method comprising:
   a. precipitating a hydrolyzable Group IVB compound to form a hydrated Group IVB oxide gel;
   b. washing the hydrated Group IVB oxide gel with water;
   c. adding aqueous acidic compounds and a soluble Group VIII metal compound to the hydrated Group IVB oxide gel, forming a slurry;
   d. mixing and peptizing a hydrated supporting oxide with the slurry;
   e. adding a partially or totally soluble Group VIB metal compound; and
   f. shaping, drying and calcining catalyst particles; and collecting an effluent with reduced nitrogen levels.

2. The method of claim 1 wherein said aqueous acidic compounds are selected from the group consisting of nitric acid, sulfuric acid, formic acid, acetic acid, oxalic acid and hydrochloric acid.

3. The method of claim 1 wherein said Group VIII metal compound contains nickel.

4. The method of claim 1 wherein said Group VIB metal compound contains molybdenum.

5. A method of hydrodenitrogenation of a hydrocarbon feed containing nitrogen compounds, which method comprises contacting said feed in a reaction zone under hydrodenitrogenation conditions comprising a temperature within the range of about 500° F. to about 850° F., a total pressure within the range of about 450 to about 3500 pounds per square inch gauge, its space velocity ranging from about 0.05 to about 5.0 (hr.$^{-1}$), and a hydrogen partial pressure ranging from about 350 to about 3200 pounds per square inch gauge, in the presence of hydrogen and with a catalyst prepared by the method comprising:
   a. precipitating a hydrolyzable titanium compound to form a hydrated titanium oxide gel;
   b. washing the hydrated titanium oxide gel with water to substantially remove non-titanium compounds;
   c. adding aqueous acidic compounds and a soluble nickel compound to the hydrated titanium oxide gel, forming a slurry;
   d. mixing and peptizing a hydrated alumina with the slurry;
   e. adding a soluble molybdenum compound;
   f. shaping, drying and calcining catalyst particles; and collecting an effluent with reduced nitrogen levels.

6. The method of claim 5 wherein the titanium compound is titanium tetrachloride.

7. The method of claim 5 wherein said nickel compound is selected from the group consisting of nickel acetate, nickel nitrate, nickel sulfate, nickel oxide, nickel chloride, nickel carbonate, nickel hydroxide and mixtures thereof.

8. The method of claim 5 wherein said molybdenum compound is selected from the group consisting of ammonium molybdate, ammonium compounds of molybdenum oxides, molybdenum oxides and their hydrogen peroxide solutions.

9. The method of claim 1 or 5 wherein the catalyst particles, after calcining, are impregnated with a phosphorous-containing compound.

10. The method of claim 9 wherein said phosphorous-containing compound is selected from the group consisting of phosphoric acid, ammonium phosphate, and phosphomolybdic acid.

11. The method of claim 5 wherein said conditions comprise a temperature within the range of about 550° F. to about 800° F., a total pressure within the range of about 600 to about 2800 pounds per square inch gauge, a space velocity ranging from about 0.1 to about 3.0(hr.$^{-1}$), and a hydrogen partial pressure ranging from about 500 to about 2500 pounds per square inch gauge.

12. The method of claim 11 or 5 which further reduces the Ramsbottom Carbon Residue of the hydrocarbon feed.

13. The method of claim 1 or 5 which further reduces the sulfur content of the hydrocarbon feed.

* * * * *